TELEPHONE PATCHING CIRCUIT

Filed Oct. 4, 1965

INVENTOR.
LAWRENCE J. SEMON
BY
Elliott & Pastoriza
ATTORNEYS.

United States Patent Office 3,397,288
Patented Aug. 13, 1968

3,397,288
TELEPHONE PATCHING CIRCUIT

Lawrence J. Semon, 710 Wilshire Blvd., Rm. 305, Santa Monica, Calif. 90411

Filed Oct. 4, 1965, Ser. No. 492,374
6 Claims. (Cl. 179—42)

ABSTRACT OF THE DISCLOSURE

A patching circuit is provided to connect an incoming call with an outgoing call at a telephone answering switchboard and includes circuitry automatically responsive to a voltage spike generated in one of the connecting lines when one of the parties hangs up to energize a tone generator. The sound from this tone generator thus automatically advises the operator at the switchboard that the patched call has been completed and she can then immediately free the lines for other calls.

Figure 1:
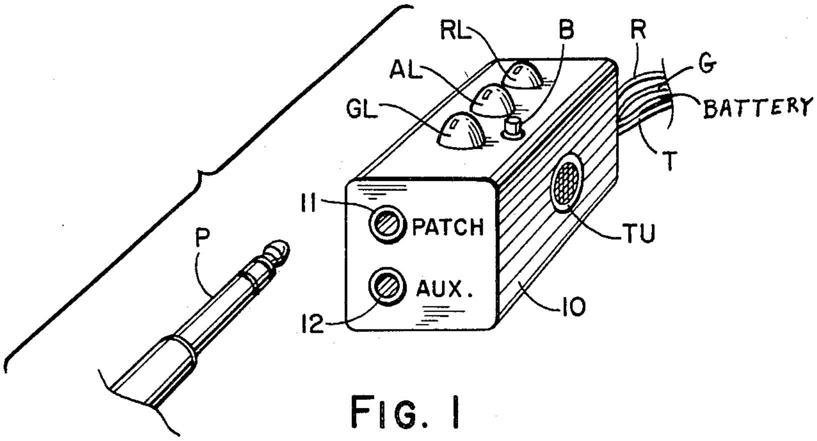

This invention relates generally to telephone switchboard "patching," sometimes also referred to as "bridging," "cross-connecting," "call extending," etc., and more particularly to an improved patching circuit for enabling telephone answering switchboard operators to connect an incoming call with an outgoing call or to effect other combinations of calls.

In telephone answering services, an operator will oftentimes receive a call for a subscriber in which the calling party wishes to speak with the subscriber. In those instances that the subscriber has left a message with his telephone answering service where he may be reached by a telephone, the operator at the answering service may dial out to the subscriber and then directly connect the incoming caller to the subscriber. It is this latter operation which is referred to as "patching" and is normally achieved by simply connecting the outgoing call plug directly into the incoming call jack after the subscriber has been reached.

The foregoing type of connection utilizes the following facilities: first, the calling party's telephone; second, the called party's telephone; third, the extension line jack on the switchboard receiving the call; that is, the plug carrying the incoming call; fourth, the trunk line on the switchboard used for reaching the called party; fifth, the called party's telephone at his new location; and, sixth, the central office "train of relays" and other equipment necessary to complete the entire loop.

It will be evident accordingly that a vast amount of equipment is tied up until the switchboard operator disconnects the various connections employed in "patching" the call. It is thus important that the operator immediately free the equipment when the conversation is completed between the parties. Without the use of some type of automatic supervision, the operator has no way of knowing when the conversation is terminated unless she monitors the line. This practice not only infringes on the privacy of conversation but also is not very practical because a switchboard is usually busy and she does not have time to monitor efficiently. Further, she could easily forget to monitor for considerable lengths of time thus "tying up" badly needed equipment. Thus, other callers cannot reach the subscriber's answering service and the subscriber himself may be prevented from using his own telephone.

In my United States Patent No. 3,113,185, issued Dec. 3, 1963, and entitled "Monitor Control Unit," there is disclosed novel patching circuitry providing automatic supervision of a patched telephone call so that an operator's attention will be immediately attracted when the call is completed. However, this system relies on a reversal of the voltage polarity between the tip and ring conductors occurring when one of the parties hangs up. In other instances, a "difference in potential" or a "momentary opening" of one of the lines such as occurs with "step-by-step equipment" is utilized to effect the automatic supervision; that is, utilized to actuate a suitable indicating means to advise the operator when the call is completed. In the case of "cross-bar" and "panel" equipment, a "time out" is necessary before a useable signal is available to indicate the hanging up of one of the parties. The "time out" period does not occur instantly and is often very irregular and sometimes does not occur at all in connection with a patched call.

Thus, various patching circuits provided heretofore have been somewhat limited with respect to the particular type of equipment with which they may be employed.

With the foregoing considerations in mind, it is accordingly a primary object of the present invention to provide a greatly improved telephone patching circuit which provides instant and automatic supervision of patched calls not only on local lines but also on "foreign" exchange lines, long line equipment, direct distance dialing and other long distance calls, on concentrator-identifier equipment and dial PBX boards, tie lines, "radio-to-land lines," and other specialized equipment such as cross-bar, panel, and step-by-step central office equipment, all to the end that a far more versatile patching unit is provided over any heretofore available.

Another important object is to provide in an improved patching circuit indicating means for indicating to an operator when a dialed out call has been answered and also indicating means for indicating to an operator that conversation is taking place between the parties of a patched call or at least that the parties are in communication with each other, in addition to the supervision indicating means indicating to the operator when the patched call has been completed.

Another object is to provide an improved telephone patching circuit which may be used on a shelf, on the face or adjacent to a switchboard, or may, if desired, be built into the switchboard so that nothing is visible except the jacks and indicators, such as lights. In this respect, it is also an object to provide a telephone patching circuit adaptable to "push button consoles" and other cordless boards.

Briefly, these and many other objects and advantages of this invention are attained by providing a telephone patching circuit including an indicating means which is automatically responsive to a voltage spike generated in one of the connecting lines between the parties whenever one of the parties hangs up. This voltage spike on the line occurs regardless of the particular type of equipment involved, and by means of the unique circuitry of this invention, it is utilized to carry out the desired automatic supervision so that the operator may immediately release all of the lines when the indicating means signifies that one of the parties has terminated the call.

The improved patching circuit also includes additional indicating means advising an operator when a dialed out called party has answered and also when the parties are both on the line and capable of conversation.

Figure 2:
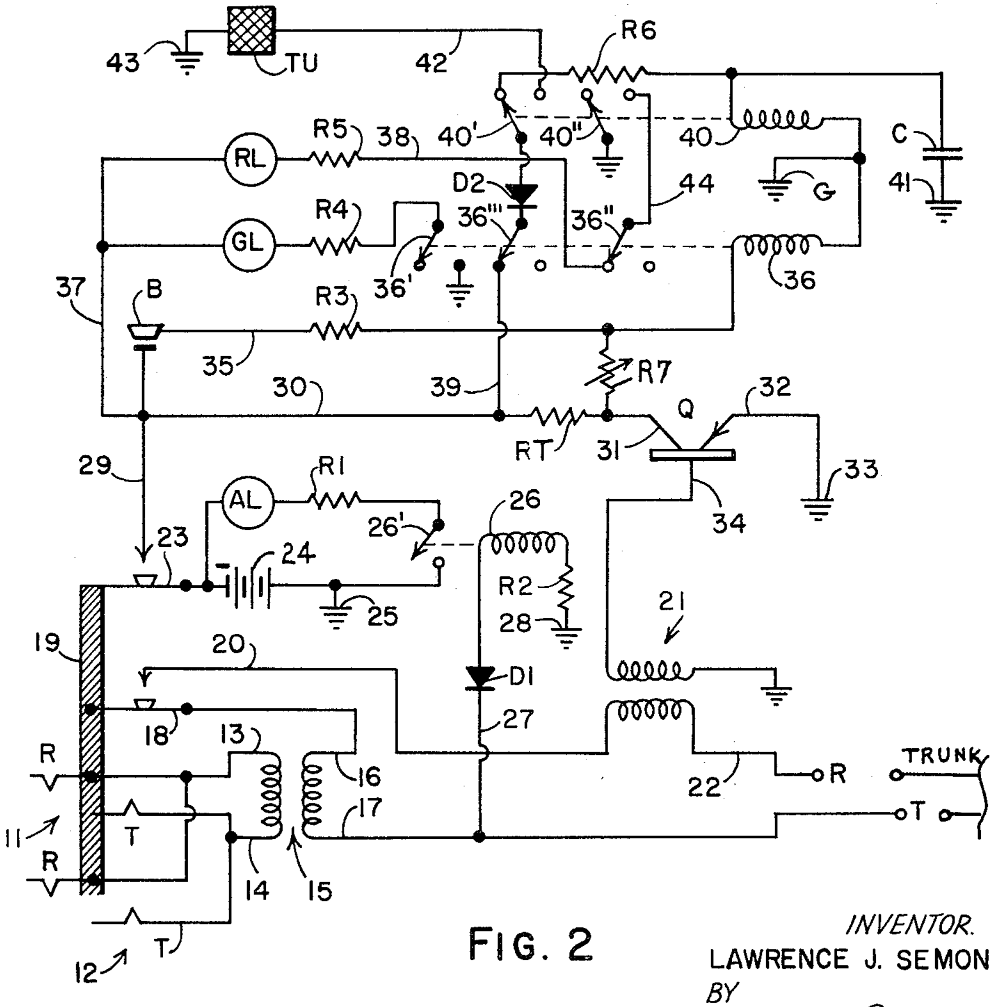

A better understanding of the invention as well as further features and advantages will be had by now referring to a preferred embodiment thereof as illustrated in the accompanying drawings, in which:

FIGURE 1 is a perspective view of the improved telephone patching circuit of this invention showing a fragmentary portion of an incoming call plug in a position preparatory to being connected to the patching unit; and, FIGURE 2 is a detailed electrical diagram of the patching circuit contained within the unit illustrated in FIGURE 1.

Referring first to FIGURE 1, the telephone patching unit comprises a housing 10 provided with an incoming call jack 11 and also, if desired, an auxiliary jack 12 which may be paralleled across the jack 11. Suitable tip and ring lines T and R are shown extending from the rear of the housing 10 for connection to the trunk line in the answering service switchboard so that a dialed out call will be connected to these tip and ring lines.

The unit also includes various indicating means which provide visible indication of the patching operation. Thus, there is illustrated at AL an amber light constituting a first indicating means; at GL a green light constituting a second indicating means; and at RL a red light and at TU a tone unit together constituting a third indicating means. On the top of the housing, there is provided a push button B. Also shown in fragmentary view in FIGURE 1 is a plug P for carrying an incoming call.

In the operation of the unit of FIGURE 1, an incoming call to a subscriber is answered by the operator. She will then dial out to the subscriber's new location using the trunk jack to which the leads T and R connect. After dialing the last digit, she can close her key and attend to other duties while the line is ringing. When the dialed out called party answers his telephone at the new location, the amber light AL will automatically turn on indicating to the operator that the dialed out called party has answered. The plug P carrying the incoming call may now be patched to the new location of the subscriber by inserting the plug in the jack 11. The operator then pushes the push button B which results in illumination of the green light GL. As long as the green light GL remains on, the operator is advised that the parties are capable of conversation or are in conversation, both parties being on the line.

When one or both of the parties hangs up, there is developed a voltage spike as described heretofore which functions to operate the third indicating means in a manner to cause the red light RL to flash and the tone unit TU to sound intermittently a tone. The operator is thus advised that the call has been completed, and she may immediately remove the plug P from the jack 11 and free the equipment for subsequent use.

In the case of cordless switchboards, the jack 11 would be replaced by a switch.

Referring now to FIGURE 2, the manner in which the foregoing indications are effected will become clear.

As shown at the lower left portion of FIGURE 2, the jack 11 includes tip and ring conductors connected to a transmission means including lines 13 and 14, isolation transformer or repeat coil 15, and lines 16 and 17. Line 16 includes a series switch 18 adapted to be actuated by a cam link 19 to effect connection to a line 20. The line 20 connects to one side of the primary of a voltage transformer 21, the line from the other side of the primary being shown at 22 and connecting to the out-call ring line R corresponding to the ring line R illustrated in FIGURE 1 for connection into the trunk line. The lower line 17 from the repeat coil 15 connects directly to the out-call tip line T also corresponding to the tip line T of FIGURE 1 connected into the trunk equipment.

The switch 18 is normally open. However, when a plug such as the plug P is inserted into the tip and ring terminals T and R of the jack 11, the ring terminal will lift the cam link 19, thereby closing the switch 18 and thus connecting the line 16 with the line 20 so that the ring portion of the plug will be connected through the repeat coil 15 and the primary of the voltage transformer 21 to the out-call ring line R.

Movement of the cam link 19 also functions to close a further switch 23 shown above the switch 18. The switch 23 connects to the negative side of a battery 24, the other side of which is grounded at 25. The amber light AL connects to the negative terminal of the battery and is in series with a current limiting resistance R1 and relay switch 26' arranged to close upon energization of its corresponding relay coil 26 to complete a circuit between the ground side of the battery and the amber light AL. The relay coil 26 is adapted to be energized through a line 27, connected to the tip line T, and including a diode D1. The other side of the relay coil 26 connects through a resistance R2 to ground at 28.

The foregoing described circuit constitutes a first indicating means wherein the amber light AL is energized when a dialed out called party answers the phone. Thus, when a called party answers the phone, there is provided a negative voltage on the tip line T, which negative voltage will serve to energize the relay 26 and thus close the switch 26' to connect the battery 24 across the amber light.

Continuing with the description of the circuit, when the cam link 19 moves up to close the switch 23, negative voltage from the battery is applied through line 29 to the line 30. This line 30 is connected through a resistance RT to the collector terminal 31 of a transistor Q. The emitter terminal 32 of the transistor Q is connected to ground at 33 and the base terminal 34 connects to the secondary of the voltage transformer 21, the other side of which is grounded as shown.

The push button B is connected such that when it is depressed, voltage from the battery 24 is also provided through the line 29 to the line 35. Line 35 connects through a resistance R3 to one side of a relay coil 36 constituting part of a second indicating means. The other side of the relay coil 36 connects to ground G as shown. The relay coil 36 is arranged to actuate simultaneously several relay switches indicated at 36', 36'', and 36'''. When the switch 36' is operated, it connects ground through a resistance R4 and the green light GL, the other side of which connects to a line 37 upon which negative voltage from the battery 24 is present since the cam link 19 has closed the switch 23. The switch 36'' when actuated disconnects from a terminal on a line 38 including a series resistance R5 and the red light RL constituting part of a third indicating means, the other side of which also connects to the line 37. Finally, operation of the ganged relay switch 36''' disconnects from a terminal on a line 39 connecting from the line 30. This switch 36''' is connected at its upper end to a diode D2 and a switch 40' arranged to be operated by a relay coil 40.

As shown, the relay coil 40 has its righthand end grounded at the common ground G with the relay coil 36 and its other end connected to a line including a capacitance C, the other side of which is grounded at 41. Also included in this line is a resistance R6, the left side of which connects to one terminal for the relay switch 40'. The other terminal shown for the switch 40' connects through a line 42 to the tone unit TU, the other side of which is grounded at 43. This tone unit together with the red light RL constitutes, as stated, part of a third indicating means and both are arranged to be energized simultaneously. The circuit is completed by the second terminal for the switch 40'' which connects through a lead 44 to the switch 36'', and by lead 38, resistor R5, lamp RL, lead 37, lead 29, and switch 23 to the negative side of battery 24. A variable resistance R7 is connected between the line 35 to the relay coil 36 and the collector terminal 31 of the transistor Q.

With the foregoing description of the various electrical components in mind, the complete operation of the circuit of FIGURE 2 will now be described. In its quiescent state in which the unit is not in use, the various switches are in their solid line positions shown. Assume that a subscriber has left word with his telephone answering service that he will be at another location and should any calls be received at the answering service, such calls should be "patched" over to the new location.

Assume now that a person is calling the subscriber. This incoming call is answered by the operator with the cord plug associated with the plug P, which the operator will later insert into the incoming call jack 11 shown in the lower left portion of FIGURE 2. Before inserting the plug P, the operator will first dial out to the subscriber's new location. When the subscriber answers, negative voltage appears on the tip line T, thereby illuminates the amber light AL as described heretofore. Illumination of the amber light AL indicates to the operator that the subscriber has answered the phone so that the operator is apprised that the called party is on the line.

The operator will now insert the plug P in the jack 11. Upon insertion of the plug in the call jack 11, the switch 18 will close on the line 20, thereby providing a transmission circuit between the ring and tip conductors R and T and the ring and tip out-call lines R and T passing into the trunk circuit. Also, as described heretofore, the resulting raising of the cam link 19 will close switch 23 to provide negative voltage from the battery 24 on the line 29 and thus on the line 30 and the line 37. This voltage will be passed up through the line 39 and the relay switch 36‴ through the diode D2 and the switch 40′ and resistance R6 to charge the condenser C to battery voltage. Also, the negative voltage on the line 30 will appear at the collector 31 of the transistor Q, but this transistor is held in an off condition as a consequence of insufficient signal on the base terminal 34.

The negative voltage on the line 30 passing through the line 39, switch 36‴, diode D2, switch 40′, resistance R6 and to the condenser C is also passed through the relay coil 40 to ground. Thus, relay coil 40 is energized to throw the switch arm 40′ and 40″ to the right. Throwing of the switch arm 40′ to the righthand terminal will apply the negative voltage to the line 42 and thus sound the tone unit. Also, throwing of the switch 40′ to the right will remove the negative voltage from the line containing the resistance R6 and condenser C. However, since this voltage is stored on the condenser C, the relay coil 40 will continue to hold the switch arms 40′ and 40″ on their righthand terminals for a short period of time sufficient to sound the tone unit. The switch arm 40″ is also moved to its righthand terminal so that ground is applied to line 44, switch arm 36″, line 38, resistance R5, and the red light RL to the line 37 and negative voltage on line 30 so that the red light RL will be energized momentarily at the same time that the tone unit is energized.

After the condenser C has discharged through the relay coil 40, the arms 40′ and 40″ are released in view of de-energization of the coil 40. When they resume their original solid line positions, the negative voltage on the line 30 up through line 39 and so forth will again charge the condenser C and energize the relay 40. Thus, the tone unit and red light are caused to operate intermittently, depending upon the time constant of the condenser C and charging resistance R6.

It will be evident, accordingly, that as soon as the operator has inserted the incoming call plug P, the tone unit and red light will intermittently operate. The operator will then press the push button B which will apply the negative voltage on the line 30 through the line 35 and resistance R3 directly to the relay coil 36. Energization of the relay coil 36 will throw the various switch arms 36′, 36″, and 36‴ to their righthand terminals. Throwing of the switch arm 36′ to its righthand terminal grounds one side of the green light through resistance R4, thus energizing the green light from the negative voltage on line 37. Throwing of the switch arm 36″ to its righthand open terminal opens the circuit from the red light on line 38 so that the red light will no longer operate, and throwing of the switch arm 36‴ to its righthand open terminal disconnects the negative voltage from the line 30 and line 39 to the condenser C and relay coil 40, thereby rendering these portions of the circuit temporarily inoperative. Also, the tone unit line 42 is rendered inoperative as a consequence of the throwing of the switch arm 36‴ to the open terminal.

The holding current for the relay coil 36 is considerably less than the actuating current resulting when the button B is depressed. Therefore, release of the button B will not result in de-energization of the relay coil 36, this relay coil 36 being held by current from the line 30 through the resistance RT and variable resistance R7. The necessary current for holding the relay 36 energized can be adjusted by varying the resistance R7.

With the plug P inserted and the GL showing, the operator is now free to carry on other activities, and the calling party and dialed out subscriber party can carry on a normal conversation through the transmission means between the incoming call jack 11 and the out-call tip and ring lines T and R.

When one of the parties hangs up, there will result a voltage spike on the out-call ring line passing through the line 22 to the primary of the voltage transformer 21. This voltage spike is amplified by the transformer 21 and applied to the base 34 of the transistor Q and will cause the transistor Q to conduct. Conduction of the transistor Q, which functions as a switch means, will thus provide a current path for the voltage from the battery 24 on the line 30 directly to ground at 33, thereby considerably reducing the current formerly passing through the variable resistance R7 to the relay coil 36. The relay coil 36 will thus "drop out" or be de-energized, thereby permitting the three switch arms 36′, 36″, and 36‴ to return to their original positions. Thus, the instant one of the parties hangs up, the switch 36′ will return to its open position, thereby extinguishing the green light GL; the switch 36″ will connect the line 44 to the line 38 and the red light RL; and the switch 36‴ will apply negative voltage from the line 30 and line 39 through switch 40′ to the condenser C and relay coil 40 through the resistance R6.

The foregoing conditions are thus the same as when the operator initially inserted the incoming call plug before depressing the push button B so that the red light RL will now flash intermittently and the tone unit TU will sound intermittently indicating to the operator that one of the parties has completed the call. By use of a tone unit, it is not necessary that the operator periodically glance at the lights and the intermittent operation of the tone unit will distinguish its sound from other normal switchboard sounds.

The operator, upon being advised by the third indicating means in the form of the red light and tone unit that one or both of the parties has completed the call, will then simply remove the incoming call plug P from the jack 11. Removal of this plug will permit the cam link 19 to move downwardly, thereby opening the switch 23 and the switch 18. Negative voltage is thus removed from the line 30 and the red light and tone unit are therefore de-energized as well as the relay coil 40. In addition, the negative voltage will be removed from the collector terminal 31 of the transistor Q so that this transistor will cease conducting and the various switches will be in their original positions preparatory to patching a subsequent call. In addition, the hanging up of the parties will remove the negative voltage from the tip line T so that the relay coil 26 will be de-energized and the amber light AL will be extinguished.

From the foregoing description, it will thus be evident that there is provided a greatly improved patching circuit. Since there is always availble a voltage spike upon hanging up of either party and since the indicating or supervising means for advising the operator when a call has been completed, is responsive to such voltage spike, the patching unit circuit is adaptable to all the various different types of telephone switchboards presently in use.

While only one particular circuit has been described for carrying out the various operations for the first, second, and third indicating means, the invention is not to be thought of as limited to the specific components set forth merely for illustrative purposes. For example, relays 26, 36, and 40 and their associated switch arms can be replaced by solid state components.

What is claimed is:

1. A telephone patching circuit for connecting and automatically supervising an incoming calling party with a dialed out called party wherein negative voltage is available on the tip line connected to the dialed out call when the dialed out call is answered and wherein a voltage spike occurs in one of the connecting lines when one of the parties hangs up, comprising, in combination: circuit means including an incoming call jack having tip and ring conductors for receiving a plug carrying said incoming call; an out-call tip line and out-call ring line for connection to said dialed out call; transmission means connecting said incoming call jack with said out-call tip line and out-call ring line in response to insertion of said plug in said jack; first indicator means connected to said tip line and responsive to said negative voltage when said dialed out call is answered after said plug has been inserted in said jack to indicate that conversation between the parties may take place; a manually operable push button; a source of voltage; a second indicating means adapted to be actuated by said source of voltage upon operation of said push button and including means for maintaining itself actuated so long as said plug is inserted and both parties are capable of conversation; a third indicating means; and spike detecting means connected between said transmission means and said third indicating means and responsive to said voltage spike to indicate the hanging up of one of said parties, said third indicating means including an audible tone generator; and said spike detecting means including a switch means for connecting said source of voltage to said tone generator, said switch means including a transistor having collector, emitter, and base terminals; and a voltage transformer, said voltage transformer being connected between said base terminal and said ring line to provide an amplified voltage spike to said transistor to thereby actuate the same.

2. A circuit according to claim 1, including means responsive to operation of said third indicating means to de-energize said second indicating means, said first indicating means being de-energized upon removal of negative voltage from said tip line when said party receiving said dialed out call hangs up.

3. A circuit according to claim 1, in which said first indicating means includes an amber light, said second indicating means includes a green light, and said third indicating means includes a tone generator and red light together with means for effecting intermittent operation thereof to provide a flashing light and repetitive tone.

4. A circuit according to claim 1, in which said switch means additionally includes a variable resistance means to enable control of said third indicating means such that said third indicating means will only be actuated when a spike exceeding a given magnitude occurs.

5. A telephone patching circuit for connecting and automatically supervising an incoming calling party with a dialed out called party wherein negative voltage is available on the tip line connected to the dialed out call when the dialed out call is answered and wherein a voltage spike occurs in one of the connecting lines when one of the parties hangs up, comprising, in combination: circuit means including an incoming call jack having tip and ring conductors for receiving a plug carrying said incoming call; an out-call tip line and out-call ring line for connection to said dialed out call; transmission means connecting said incoming call jack with said out-call tip line and out-call ring line in response to insertion of said plug in said jack; a source of voltage; an audible tone generator; and spike detecting means connected between said transmission means and said tone generator and responsive to said voltage spike to effect a connection of said voltage source to said tone generator to indicate the hanging up of one of said parties, said spike detecting means including a transistor having collector, emitter, and base terminals; and a voltage transformer, said voltage transformer being connected between said base terminal and said ring line to provide an amplified voltage spike to said transistor to thereby actuate the same and effect said connection of said source of voltage to said tone generator.

6. A circuit according to claim 5, including a variable resistance means in the circuit of said transistor to enable control of the connection between said source of voltage and said tone generator such that said tone generator will only be actuated when a spike exceeding a given magnitude occurs.

References Cited

UNITED STATES PATENTS

| | | | |
|---|---|---|---|
| 1,799,916 | 4/1931 | Mansfield | 179—91 |
| 3,113,185 | 3/1962 | Semon | 179—42 |

KATHLEEN H. CLAFFY, *Primary Examiner.*

D. L. STEWART, *Assistant Examiner.*